United States Patent
Ka et al.

(10) Patent No.: US 12,105,527 B2
(45) Date of Patent: Oct. 1, 2024

(54) SYSTEM FOR DRONE CALIBRATION AND METHOD THEREFOR

(71) Applicant: PRENEU, Seoul (KR)

(72) Inventors: Chung Hee Ka, Seoul (KR); Jong Kyeong Lee, Seoul (KR); Hyun Jin Jung, Seoul (KR)

(73) Assignee: PRENEU, Seoul (KR)

( * ) Notice: Subject to any disclaimer, the term of this patent is extended or adjusted under 35 U.S.C. 154(b) by 0 days.

(21) Appl. No.: 17/797,670

(22) PCT Filed: Feb. 28, 2020

(86) PCT No.: PCT/KR2020/002877
§ 371 (c)(1),
(2) Date: Aug. 4, 2022

(87) PCT Pub. No.: WO2021/157772
PCT Pub. Date: Aug. 12, 2021

(65) Prior Publication Data
US 2023/0055083 A1 Feb. 23, 2023

(30) Foreign Application Priority Data
Feb. 4, 2020 (KR) .................. 10-2020-0013326

(51) Int. Cl.
*G05D 1/00* (2024.01)
*B64C 39/02* (2023.01)

(52) U.S. Cl.
CPC .......... *G05D 1/085* (2013.01); *B64C 39/024* (2013.01)

(58) Field of Classification Search
None
See application file for complete search history.

(56) References Cited

U.S. PATENT DOCUMENTS

| 11,079,252 B2 | 8/2021 | Cook et al. |
| 2018/0003777 A1 | 1/2018 | Sorensen et al. |
| 2018/0112980 A1* | 4/2018 | Diem ............ G01C 17/38 |
| 2018/0120109 A1 | 5/2018 | Fite-Georgel et al. |

FOREIGN PATENT DOCUMENTS

| CN | 109870153 A | 6/2019 |
| JP | 6320542 B2 | 5/2018 |
| KR | 10-2019-0116249 A | 10/2019 |

OTHER PUBLICATIONS

KR Office Action dated Feb. 25, 2020 as received in Application No. 10-2020-0013326.
KR Decision to Grant dated May 18, 2020 as received in Application No. 10-2020-0013326.

* cited by examiner

*Primary Examiner* — Hongye Liang
(74) *Attorney, Agent, or Firm* — Maschoff Brennan

(57) ABSTRACT

Disclosed are a system for drone calibration related to calibration that is required prior to flying a drone, and a method therefor. According to the present invention, there is an effect of improving the convenience of a calibration operation required for flying a drone, and in addition, when multiple drones have to be flying at the same time, there is an effect of allowing the drone to be easily calibrated without manually calibrating each of the multiple drones.

1 Claim, 2 Drawing Sheets

[FIG. 1]
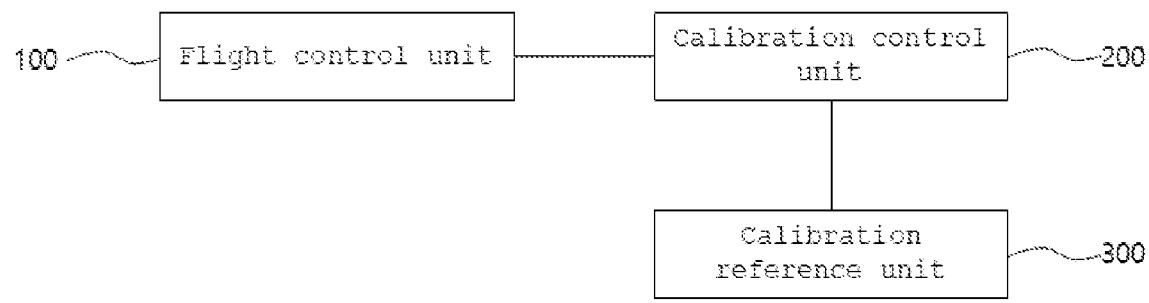
[FIG. 2]
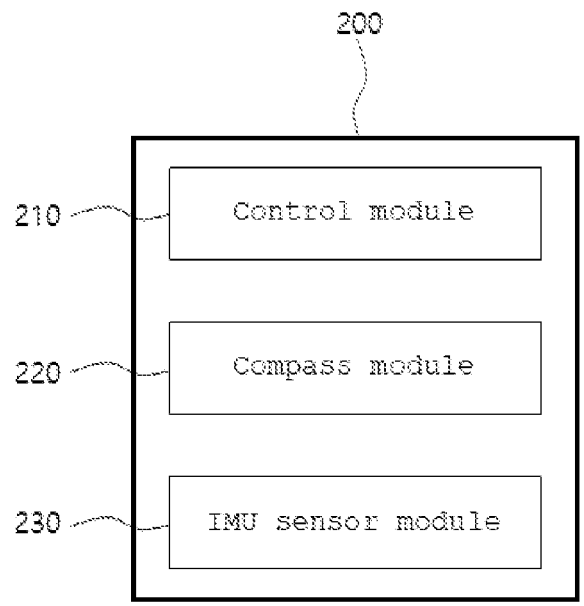

[FIG. 3]
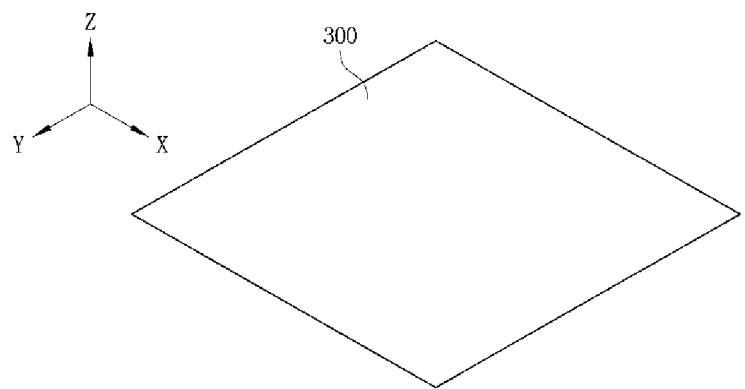
[FIG. 4]
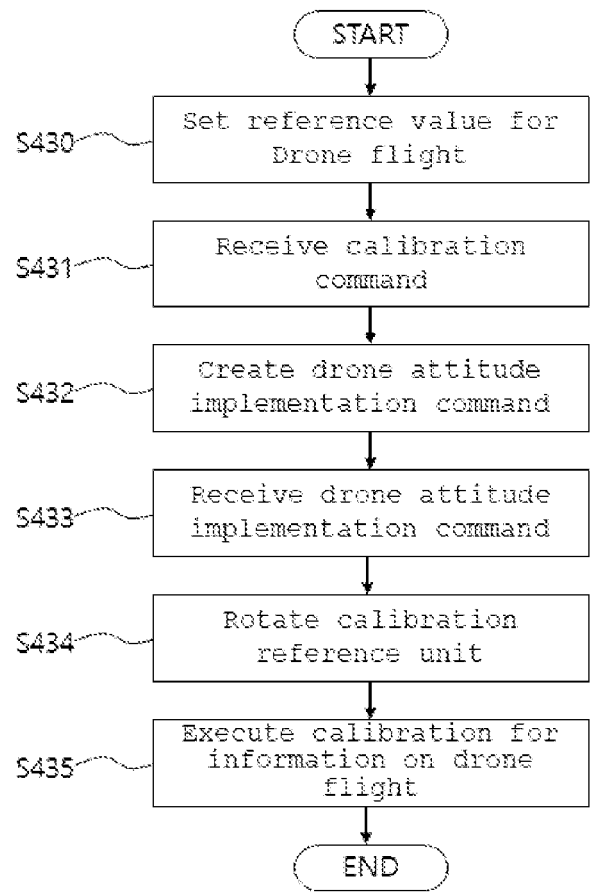

SYSTEM FOR DRONE CALIBRATION AND METHOD THEREFOR

TECHNICAL FIELD

The present invention relates to a drone calibration system and a method therefor, and more particularly, to a drone calibration system and a method therefor, which are relevant to calibration essentially conducted prior to flight of a drone.

BACKGROUND ART

For drones, it is common to rotate rotors in four (4) directions simultaneously using a single motor or engine.

Generally, key modules to control smooth flight of a drone include an attitude and heading reference system (AHRS) and a flight controller (FC), wherein AHRS calculates three-dimensional (6-axis or 9-axis) attitude control information data that can maintain the attitude of a drone body using an accelerometer, a gyroscope, a magnetometer, etc., while FC controls thrust information of a motor controller in the drone using the calculated data, thereby keeping the drone flying.

In addition to AHRS and FC, the drone includes diverse devices such as GPS, barometer, ultrasonic sensor, telemetry, RC receiver, wireless communication modules, etc. in order to combine and use information, whereby the drone would avoid obstacles while keeping normal flight, safely take off/land, return to the original take-off point and/or implement remote control functions.

Since the configuration of a conventional drone consists of such different devices/modules as described above in combination, complexity of physical (or mechanical) configurations is an unavoidable problem. Further, since the wireless communication network used by each drone or the communication channel through RC receiver may be configured differently, it is difficult to integrally manage/control multiple drones simultaneously.

Further, since some problems occurring during flight may lead to major accidents such as falling of the drone from the sky, it is necessary to prevent such problems in advance.

As such, in order to solve such various problems as described above, it is essential to execute calibration of the drone prior to flight.

The calibration refers to an operation of restoring or correcting initial values of various sensors used in a drone to normal values if there is a problem with the initial values.

Conventional calibration is only to conduct correction of a corresponding sensor value by a person who manually takes (or sets) an attitude of the drone, but development of other specific technologies has yet to be progressed.

Therefore, the prior art such as assessment of stability for drones could not replace the calibration to be executed before flying the drone. Further, a drone seating jig in which the drone seating part is formed to seat and fix the drone therein is an essential component. Therefore, in the case of a large drone such as an industrial drone, a size of the drone seating jig would also become huge, hence entailing a problem of deteriorated effectiveness. Further, in the case of a drone used by general public, individuals should directly purchase such a drone seating jig, which also entails a problem of deteriorated effectiveness.

Further, in the assessment of stability for drones, calibration of sensor values could not actually be executed. Therefore, if it is required to fly a plurality of drones simultaneously along with improvement of convenience in calibration, there is a problem that the above assessment cannot be a fundamental solution to overcome the shortcomings of manually calibrating each of the plural drones.

(Patent Document 1) Korean Patent Publication No. 10-1972784 (registered on Apr. 22, 2019)

DISCLOSURE

Technical Problem

Accordingly, a first object of the present invention to solve the above problem is to provide a drone calibration system that: makes it easy to execute calibration of a drone even without manual operation of each of plural drones one by one when a plurality of drones needs to be flown simultaneously along with improvement of convenience in calibration work, which is essential for flight of a drone; allows even a beginner to easily fly the drone because of improved convenience of calibration; and may reduce a preparation time for flying industrial drones.

Further, a second object of the present invention is to provide a drone calibration method that: makes it easy to execute calibration of a drone even without manual operation of each of plural drones one by one when a plurality of drones needs to be flown simultaneously along with improvement of convenience in calibration work, which is essential for flight of a drone; allows even a beginner to easily fly the drone because of improved convenience of calibration; and may reduce a preparation time for flying industrial drones.

Technical Solution

In order to achieve the first object, the present invention provides a drone calibration system, including: a flight control unit that sets a reference value for flight of a drone; a calibration control unit that receives a calibration command from the flight control unit and creates a drone attitude implementation command corresponding to the calibration command; and a calibration reference unit that receives the drone attitude implementation command from the calibration control unit and rotates based on at least one of a first axis, a second axis and a third axis in response to the drone attitude implementation command, wherein the calibration control unit may execute calibration for information relevant to drone flight using a result of the rotation of the calibration reference unit.

The calibration for the information relevant to the drone flight may include at least one of Inertia Measurement Unit (IMU) calibration and compass calibration.

The calibration control unit may transmit calibration data as a result of executing the calibration for information relevant to the flight of the drone to the flight control unit.

The flight control unit may change a preset reference value to correspond to the calibration data.

In order to achieve the second object, the present invention provides a drone calibration method, including: setting a reference value for drone flight by a flight control unit; receiving a calibration command from the flight control unit by a calibration control unit; creating a drone attitude implementation command corresponding to the calibration command by the calibration control unit; receiving the drone attitude implementation command from the calibration control unit by a calibration reference unit; rotating the calibration reference unit based on at least one of first axis, second axis and third axis in response to the drone attitude implementation command; and executing calibration for information relevant to drone flight using a result of the rotation of the calibration reference unit by the calibration control unit.

Advantageous Effects

According to the drone calibration system and method of the present invention as described above, when it is required to fly a plurality of drones simultaneously along with improvement of convenience in calibration work, which is essential for drone flight, calibration of a drone c be easily executed even without calibrating each plural drones one by one, even beginners can easily fly the drone because of improved convenience of calibration, and effects of reducing a preparation time for flying industrial drones may be achieved.

DESCRIPTION OF DRAWINGS

FIG. 1 illustrates a schematic configuration of a drone calibration system according to an embodiment of the present invention.

FIG. 2 illustrates a schematic configuration of a calibration control unit, which is one component in the present invention.

FIG. 3 is a diagram for explaining rotation of a calibration reference unit, which is one component in the present invention.

FIG. 4 illustrates a schematic flow of a drone calibration method according to an embodiment of the present invention.

BEST MODE

Terms and words used in the present specification and claims are not limited to the usual or dictionary meanings and, on the basis of the principle that the inventor may appropriately define the concept of terms in order to describe an invention to be used by users in the best way, the above terms and words should be interpreted as the meanings and concepts consistent with the technical idea of the present invention.

Throughout the specification, when a part "includes" any component, this means that other components may be further included rather than excluding the same unless specifically stated otherwise. Further, terms such as ".part", ".device", ".member", "module", "apparatus", etc. refer to a unit that processes at least one function or operation, which may be implemented by a combination of hardware and/or software.

The terms used in the embodiments of the present invention will be briefly described, while the present embodiments will be described in more detail.

The terms used in the embodiments of the present invention have been selected from general terms that are currently widely used as possible while considering functions thereof in the present invention. However, these may vary depending on intention of a technician working in the field, precedent, emergence of new technologies, or the like. Further, in a specific case, there are terms arbitrarily selected by an applicant and, in this case, the meanings of the terms would be described in detail in the description of the corresponding embodiments. Therefore, the terms used in the present embodiments should be defined based on the meanings of the terms and the overall contents of the present embodiments rather than a simple name of each of the terms.

In the embodiments of the present invention, terms including ordinal number such as "first", "second", etc. may be used to describe different elements but these elements are not limited thereby. The above terms are used only for the purpose of distinguishing one component from another component. For example, without departing from the scope of the present invention, a first element may be referred to as a second element and, similarly, a second element may also be referred to as a first element. Further, the term "and/or" may include a combination of a plurality of related and mentioned items or any among a plurality of related and mentioned items.

Further, in the embodiments of the present invention, a singular expression may include a plurality of expressions unless the context clearly indicates otherwise.

Further, in the embodiments of the present invention, terms such as "include" or "have" are intended to designate the existence of features or numbers, steps, actions, components, parts or a combination thereof described in the specification, therefore, it is to be understood that the possibility of the presence or addition of one or more other features or numbers, steps, actions, components, parts or a combination thereof is not preliminarily excluded.

Further, in the embodiments of the present invention, the "module" or "unit" may execute at least one function or operation, and may be implemented as hardware or software, or a combination of hardware and software. Further, a plurality of "modules" or a plurality of "units" may be integrated into at least one module and implemented as at least one processor except for the "module" or "unit" that needs to be implemented with specific hardware.

In addition, in the embodiments of the present invention, when a part is "connected" with another part, it is not only "directly connected" but also includes a case where the part is "electrically connected" with another part while interposing a different element therebetween.

DETAILED DESCRIPTION OF PREFERRED EMBODIMENTS OF INVENTION

Hereinafter, the embodiments of the present invention will be described in detail with reference to the accompanying drawings.

FIG. 1 illustrates a schematic configuration of a drone calibration system according to an embodiment of the present invention; FIG. 2 illustrates a schematic configuration of a calibration control unit, which is one component in the present invention; and FIG. 3 is a diagram for explaining rotation of a calibration reference unit, which is one component in the present invention.

Referring to FIGS. 1 to 3, the drone calibration system may include a flight control unit 100, a calibration control unit 200 and a calibration reference unit 300, wherein the calibration control unit 200 may include a control module 210, a compass module 220 and an IMU sensor module 230.

Throughout the specification, IMU may refer to an Inertia Measurement Unit.

Further, the flight control unit 100 may be installed on an inner space of the drone, while the calibration control unit 200 and the calibration reference unit 300 may be installed inside or outside the drone.

In the case of the embodiment to be described later, for convenience of explanation, it has been illustrated that the calibration control unit 200 and the calibration reference unit 300 are installed on the inner space of the drone, however, it can also be implemented in the same way even if the calibration control unit 200 and the calibration reference unit 300 are provided outside the drone.

However, when the calibration control unit 200 and the calibration reference unit 300 are installed outside the drone, it would be implemented differently from a case where the calibration control unit 200 and the calibration reference unit 300 are installed on the inner space of the drone, and such different implementations will be described separately.

The flight control unit 100 may set a reference value for flight of a drone.

In this regard, the reference value for drone flight may include an inertia value relevant to the IMU sensor module 230, and the inertia value relevant to the IMU sensor module 230 may refer to an inertia value sensed by the IMU sensor module 230 that consists of a barometer gyroscope and an accelerometer.

This inertia value may mean a value helpful for stably flying the drone. At this time, when the IMU sensor module 230 for sensing the inertia value does not properly sense the inertia value with respect to the drone, a problem that the drone is not properly operated, a problem that motion of the drone cannot be properly controlled, etc. may occur.

In other words, with regard to setting a reference value for drone flight, the flight control unit 100 may set an inertia value sensed by the IMU sensor module 230, as the reference value for drone flight, while reflecting drone state information including information on the current drone position, inclination of the drone, etc.

More specifically, the accelerometer may detect a speed, position, slope, change of direction, etc. based on three-axial directions of X-axis, Y-axis and Z-axis, thereby assisting the flight of drone.

Further, the reference value for drone flight may include a magnetic value associated with the compass module 220, wherein the magnetic value associated with the compass module 220 may mean a magnetic value sensed by the compass module 220 consisting of a magnetometer.

That is, with regard to setting the reference value for drone flight, the flight control unit 100 may set a magnetic value sensed by the compass module 220, as the reference value for drone flight, while reflecting the drone state information including information on the current drone position, inclination of the drone, etc.

The compass module 220 may exhibit compass functions and assist the flight of the drone through GPS location information and bearing information of the magnetometer. Further, if the compass module 220 does not properly sense the magnetic value of the drone, a problem that the drone does not work properly, a problem that motion of the drone cannot be properly controlled, etc. may occur.

That is, the reference value for drone flight may mean a referential inertia value to the inertia value sensed by the IMU sensor module 230, and may also mean a referential magnetic value to the magnetic value sensed by the compass module 220.

Further, the reference value for drone flight may refer to a reference value by drone attitude.

That is, it could be known that the reference value for drone flight may vary for drone attitude.

With respect to the above description, when the calibration control unit 200 and the calibration reference unit 300 are present outside, the flight control unit 100 may set a reference value for drone flight, more specifically, may set a magnetic value sensed by an internal compass module (not shown) installed inside the drone, as the reference value for drone flight, while reflecting the drone state information including information on the current drone position, inclination of the drone, etc. and, alternatively, may set an inertia value sensed by an internal IMU sensor module (not shown) installed inside the drone, as the reference value for drone flight, while reflecting the drone state information including information on the current drone position information, inclination of the drone, etc.

Further, the flight control unit 100 may transmit the drone state information including information on the current drone position, inclination of the drone, etc. to the calibration control unit 200, while the calibration control unit 200 may execute calibration by reflecting the received drone state information.

When the calibration control unit 200 and the calibration reference unit 300 are present outside the drone, the current state of the drone cannot be properly reflected. Therefore, as described above, it will be necessary that the flight control unit 100 in the drone transmits information on the current state of the drone to the calibration control unit 200.

However, if the calibration control unit 200 and the calibration reference unit 300 are present inside the drone, drone state information including information on the current drone position, inclination of the drone, etc. will be reflected to the calibration control unit 200 and the calibration reference unit 300 during calibration even though the drone state information is not directly transmitted to the calibration control unit 200 by the flight control unit 100.

Further, the calibration control unit 200 may be installed in the calibration reference unit 300 or may be implemented in an integrated form.

Further, the calibration control unit 200 may receive a calibration command from the flight control unit 100, and may create a drone attitude implementation command corresponding to the calibration command.

In this regard, the calibration command may mean executing calibration of the corresponding drone, and the drone attitude implementation command corresponding to the calibration command may be a command to maintain an attitude of the drone required to execute the calibration, and thus may mean a command for implementing a preset drone attitude.

Further, in the case of the preset drone attitude, it may include one or more drone attitudes.

Further, the calibration reference unit 300 may receive the drone attitude implementation command from the calibration control unit 200, and may rotate based on at least one of the first axis, second axis and third axis in response to the drone attitude implementation command.

Referring to FIG. 3, the calibration reference unit 300 may rotate based on at least one of X-axis, Y-axis and Z-axis as described in FIG. 3 and, in order to rotate based on at least one of X-axis, Y-axis and Z-axis, the calibration reference unit 300 may be implemented as a gimbal structure.

However, it is not limited to the gimbal structure, but any structure may be used as long as the calibration reference unit 300 can rotate based on at least one of the X-axis, Y-axis and Z-axis.

Herein, the first axis, second axis and third axis may correspond to the X-axis, Y-axis and Z-axis shown in FIG. 3, respectively.

Further, the calibration control unit 200 may execute calibration for the information relevant to drone flight using a result of the rotation of the calibration reference unit 300.

Specifically, the calibration reference unit 300 may rotate based on at least one of the first axis, second axis and third axis in response to the drone attitude implementation command to implement the preset drone attitude, whereby a state, in which the corresponding drone is fixed in the same attitude as the preset drone attitude, can be implemented. Further, when the state, in which the corresponding drone is fixed in the same attitude as the preset drone attitude, was implemented, the IMU sensor module 230 and the compass module 220 may sense an inertia value and a magnetic value, respectively, which are the information relevant to drone flight.

That is, in the case where the corresponding drone has the same attitude as the preset drone attitude, it may be assumed to be the same state as the sensing of the inertia value and the magnetic value, whereby the inertia value and the magnetic value can be sensed.

At this time, the calibration for information relevant to drone flight may include at least one of Inertia Measurement Unit (IMU) calibration and compass calibration.

Specifically, IMU calibration among the calibration for information relevant to drone flight may include calibration for inertia value sensed by the IMU sensor module 230, while the compass calibration among the calibration for information relevant to drone flight may include calibration for magnetic value sensed by the compass module 220.

In this regard, the calibration of the inertia value sensed by the IMU sensor module 230 may include an inertia value sensed by the IMU sensor module 230 in a state in which the corresponding drone is fixed in the same attitude as the preset drone attitude, while the calibration of the magnetic value sensed by the compass module 220 may include a magnetic value sensed by the compass module 220 in a state in which the corresponding drone is fixed in the same attitude as the preset drone attitude.

Further, the calibration control unit 200 may transmit calibration data, which is a result of executing calibration for information relevant to drone flight, to the flight control unit 100.

Herein, the calibration data, which is a result of executing calibration for information relevant to drone flight, may include the inertia value sensed by the IMU sensor module 230 and the magnetic value sensed by the compass module 220 in a state in which the corresponding drone is fixed in the same attitude as the preset drone attitude.

Further, the flight control unit 100 may change a preset reference value to correspond to the calibration data.

Specifically, in a state in which a reference value for flight of the corresponding drone, that is, a reference inertia value and a reference magnetic value for a specific attitude of the drone among reference values for flight of the corresponding drone are set as the reference values, the flight control unit 100 may transmit a calibration command indicating implementation of the same attitude as the above specific attitude to the control module 210. Following this, the control module 210 may create a drone attitude implementation command corresponding to the calibration command, and then may transmit the created drone attitude implementation command to the calibration reference unit 300.

Further, in order to implement the attitude of the drone required to execute the drone attitude implementation command received from the control module 210 (a drone attitude included in the drone attitude implementation command), the calibration reference unit 300 may rotate based on at least one of the first axis, second axis and third axis.

Further, as the calibration reference unit 300 rotates based on at least one of the first axis, second axis and third axis, it is possible to attain the same settings as a drone attitude required to execute the drone attitude implementation command, that is, a drone attitude included in the drone attitude implementation command.

Further, with regard to the corresponding drone, when the setting is the same as that of the drone attitude included in the drone attitude implementation command, the compass module 220 may sense a magnetic value in the same setting as the attitude of the corresponding drone.

Further, with regard to the corresponding drone, when the setting is the same as that of the drone attitude included in the drone attitude implementation command, the IMU sensor module 230 may sense an inertia value in the same setting as the attitude of the corresponding drone.

Further, with regard to the corresponding drone, when the setting is the same as that of as that of the drone attitude included in the drone attitude implementation command, the control module 210 may transmit the magnetic value at the same setting as the attitude of the corresponding drone sensed by the compass module 220 (hereinafter, "sensed magnetic value") and the inertia value at the same setting as the attitude of the corresponding drone sensed by the IMU sensor module 230 (hereinafter, "sensed inertia value") to the flight control unit 100.

Further, the flight control unit 100 may compare the sensed magnetic value and the sensed inertia value received from the control module 210 with a preset reference value for flight of the drone.

More specifically, the flight control unit 100 may compare the sensed magnetic value and the sensed inertia value received from the control module 210 with the referential magnetic value and the referential inertia value at the same drone attitude as that included in the drone attitude implementation command.

As a result of the comparison by the flight control unit 100, if the sensed magnetic value and the referential magnetic value are the same, the flight control unit 100 does not execute compass calibration with respect to the compass module 220 that senses the magnetic value. However, when the sensed magnetic value and the referential magnetic value are different from each other, the flight control unit 100 may execute compass calibration with respect to the compass module 220 that senses the magnetic value.

In this regard, compass calibration may mean that the referential magnetic value at the same drone attitude as that included in the drone attitude implementation command is updated into the sensed magnetic value.

Further, as a result of comparison by the flight control unit 100, if the sensed inertia value and the referential inertia value are the same, the flight control unit 100 does not execute IMU calibration with respect to the IMU sensor module 230 that senses the inertia value. However, when the sensed inertia value and the referential inertia value are different from each other, the flight control unit 100 may execute IMU calibration with respect to the IMU sensor module 230 that senses the inertia value.

In this regard, IMU calibration may mean that the referential inertia value at the same drone attitude as that included in the drone attitude implementation command is updated into the sensed inertia value.

FIG. 4 illustrates a schematic flow of a drone calibration method according to an embodiment of the present invention.

Referring to FIG. 4, the flight control unit 100 may set a reference value for flight of the drone (S430).

Further, the calibration control unit 200 may receive a calibration command from the flight control unit 100 (S431).

Further, the calibration control unit 200 may create a drone attitude implementation command corresponding to the calibration command (S432).

Further, the calibration reference unit 300 may receive the drone attitude implementation command from the calibration control unit 200 (S433).

Further, the calibration reference unit 300 may rotate based on at least one among a first axis, a second axis and a third axis in response to the drone attitude implementation command (S434).

Further, the calibration control unit 200 may execute calibration for information relevant to drone flight using a result of the rotation of the calibration reference unit 300 (S435).

The configuration and operation of the drone calibration system and the method therefor according to the embodiments of the present invention may be performed as described above. Meanwhile, although specific embodiments have been described in the description of the present invention, various modifications can be made without departing from the scope of the present invention.

Although the present invention has been described above with reference to limited embodiments and drawings, the present invention is not limited thereto and various alterations and modifications are of course possible by those skilled in the art to which the present invention pertains.

Those skilled in the art related to the present embodiments will understand that the present invention could be implemented in modified forms within a range not departing from essential characteristics of the above description. Therefore, the disclosed methods should be considered in an aspect of illustration rather than a restricted sense. The scope of the present invention is stipulated in the claims rather than the foregoing description, and all differences within the scope equivalent thereto should be construed as being included in the present invention.

EXPLANATION OF REFERENCE NUMERALS

100: Flight control unit 20: Calibration control unit
210: Control module 220: Compass module
230: IMU sensor module 300: Calibration reference unit

INDUSTRIAL APPLICABILITY

According to the drone calibration system and the method therefor according to an embodiment of the present invention, when it is necessary to fly a plurality of drones simultaneously along with improvement of convenience in calibration work, which is essential for drone flight, calibration of a drone can be easily executed even without manually calibrating each of plural drones one by one.

According to the drone calibration system and method therefor capable of attaining such effects as described above, it is possible to increase efficiency in different work environments through industrial drones, therefore, it is determined that the drone is applicable to not only the drone industry but also to various industrial and technical applications.

The invention claimed is:

1. A drone calibration method, comprising:
setting a reference value of drone attitude by a flight control unit;
receiving a calibration command from the flight control unit by a calibration control unit;
creating a drone attitude implementation command corresponding to the calibration command by the calibration control unit;
receiving the drone attitude implementation command from the calibration control unit by a calibration reference unit;
rotating the calibration reference unit based on at least one of an X-axis, a Y-axis, and a Z-axis in response to the drone attitude implementation command; and
executing calibration for information relevant to drone flight by the calibration control unit using a result of the rotation of the calibration reference unit,
the drone attitude implementation command is a command for implementing a preset drone attitude,
the calibration reference unit rotates based on at least one of the X-axis, the Y-axis and the Z-axis, the calibration reference unit being implemented as a gimbal structure,
the calibration control unit senses an inertia value and a magnetic value when the calibration reference unit rotates and is fixed in a same attitude as the preset drone attitude, and transmits the inertia value and the magnetic value to the flight control unit, and
the flight control unit transmits the calibration command to the calibration control unit when the inertia value differ from a reference inertia value.

* * * * *